US012589684B2

(12) United States Patent
Hashizume et al.

(10) Patent No.: US 12,589,684 B2
(45) Date of Patent: Mar. 31, 2026

(54) SEAT PAD AND METHOD FOR MANUFACTURING SEAT PAD

(71) Applicant: Archem Inc., Tokyo (JP)

(72) Inventors: Akira Hashizume, Yokohama (JP); Masaki Shinagawa, Yokohama (JP)

(73) Assignee: Archem Inc., Tokyo (JP)

( * ) Notice: Subject to any disclaimer, the term of this patent is extended or adjusted under 35 U.S.C. 154(b) by 177 days.

(21) Appl. No.: 18/559,794

(22) PCT Filed: Nov. 19, 2021

(86) PCT No.: PCT/JP2021/042697
§ 371 (c)(1),
(2) Date: Nov. 9, 2023

(87) PCT Pub. No.: WO2022/239273
PCT Pub. Date: Nov. 17, 2022

(65) Prior Publication Data
US 2024/0227647 A1       Jul. 11, 2024

(30) Foreign Application Priority Data

May 11, 2021    (JP) ................................. 2021-080548

(51) Int. Cl.
*B60N 2/70*        (2006.01)

(52) U.S. Cl.
CPC .................................. *B60N 2/7017* (2013.01)

(58) Field of Classification Search
CPC .................................................. B60N 2/7017
See application file for complete search history.

(56) References Cited

U.S. PATENT DOCUMENTS

| | | | |
|---|---|---|---|
| 7,967,389 B2* | 6/2011 | Galbreath | ............ B60N 2/7035 297/452.48 |
| 2011/0278902 A1 | 11/2011 | Galbreath et al. | |
| 2012/0049605 A1 | 3/2012 | Sanefuji et al. | |
| 2015/0290848 A1 | 10/2015 | Sanefuji et al. | |
| 2018/0272905 A1 | 9/2018 | Ruff et al. | |

FOREIGN PATENT DOCUMENTS

| | | |
|---|---|---|
| CN | 102413739 A | 4/2012 |
| JP | 2010036351 A | 2/2010 |
| JP | 2010259535 A | 11/2010 |
| JP | 2013208736 A | 10/2013 |
| JP | 2014205490 A | 10/2014 |
| JP | 2015042519 A | 3/2015 |
| JP | 2018076044 A | 5/2018 |
| JP | 2018134360 A | 8/2018 |
| JP | 2018158096 A | 10/2018 |

OTHER PUBLICATIONS

Nov. 14, 2023, International Preliminary Report on Patentability issued in the International Patent Application No. PCT/JP2021/042697.
Feb. 8, 2022, International Search Report issued in the International Patent Application No. PCT/JP2021/042697.
Nov. 20, 2025, search result of Office Action issued by the China National Intellectual Property Administration in the corresponding Chinese Patent Application No. 202180098036.6.

* cited by examiner

*Primary Examiner* — Anthony D Barfield
(74) *Attorney, Agent, or Firm* — KENJA IP LAW PC

(57)                ABSTRACT
A seat pad including a cushion pad 1. The cushion pad (1) includes a soft foam (2) and a beaded foam (3) embedded in the soft foam (2). The bottom surface of the cushion pad (1) is formed by the bottom surface (2/2) of the soft foam (2).

10 Claims, 14 Drawing Sheets

SEAT PAD AND METHOD FOR MANUFACTURING SEAT PAD

TECHNICAL FIELD

The present disclosure relates to a seat pad and a method for manufacturing a seat pad.

BACKGROUND

In some conventional seat pads, the support stability of the seat pad has been improved by forming the seat pad body with a soft foam and covering a portion of the bottom surface of the soft foam with beaded foam (see, for example, Patent Literature (PTL) 1). Regarding this, as another conventional seat pad, a through hole is formed in the beaded foam and soft foam material is supplied through the through hole, thereby covering a portion of the bottom surface of the beaded foam with soft foam (see, for example, PTL 2).

CITATION LIST

Patent Literature

PTL 1: JP 2010-259535 A
PTL 2: JP 2018-134360 A

SUMMARY

Technical Problem

According to the conventional seat pads described above, the bottom surface of the seat pad, formed by the bottom surface of the soft foam and the bottom surface of the beaded foam, is made smooth by matching the plane levels of the bottom surface of the soft foam and the bottom surface of the beaded foam.

However, beaded foam is more susceptible to heat than soft foam. Therefore, the conventional seat pads described above have room for improvement in heat resistance.

It would be helpful to provide a seat pad having excellent heat resistance and a method for manufacturing a seat pad to easily manufacture the seat pad.

Solution to Problem

The seat pad according to the present disclosure is a seat pad comprising a cushion pad, the cushion pad comprising a soft foam and a beaded foam embedded in the soft foam, wherein the bottom surface of the cushion pad is the bottom surface of the soft foam. The seat pad according to the present disclosure has excellent heat resistance.

The seat pad according to the present disclosure is preferably configured so that the soft foam comprises an upper soft foam covering the top surface of the beaded foam and a lower soft foam covering the bottom surface of the beaded foam. Accordingly, the seating side is covered by soft foam, and therefore comfort is improved for seating and excellent heat resistance is provided.

The seat pad according to the present disclosure is preferably configured so that the beaded foam has a through hole in the vertical direction, and the upper soft foam and the lower soft foam are connected via the through hole through the beaded foam. Accordingly, the seat pad has excellent heat resistance and is easy to manufacture.

The seat pad according to the present disclosure is preferably configured so that the seat pad is for a rear seat of a vehicle. The seat pad according to the present disclosure is particularly effective for use as a seat pad for a rear seat of a vehicle.

The seat pad according to the present disclosure is preferably configured so that the beaded foam has two below-buttocks openings and the through hole positioned between the two below-buttocks openings. Accordingly, the seat pad has excellent heat resistance and is easy to manufacture for use as a seat pad for a rear seat of a vehicle.

The seat pad according to the present disclosure is preferably configured so that the soft foam is composed of soft polyurethane foam, and the beaded foam is composed of beaded expanded polypropylene or beaded expanded polystyrene. Accordingly, the use of commonly used soft foam and beaded foam results in a seat pad having excellent cost performance.

The method for manufacturing a seat pad according to the present disclosure is a method using a mold including a gas venting portion and a beaded foam with a through hole, wherein the outer surface of the beaded foam with the through hole opening is covered by a soft foam, the method comprising: beaded foam setting, wherein the beaded foam is positioned in the interior of the mold so that a space is formed between the mold and the beaded foam, and the through hole of the beaded foam is positioned offset from the gas venting portion; and foam material supplying after completion of the beaded foam setting, wherein soft foam material is supplied to the interior of the mold so that the soft foam material passes through the through hole in the beaded foam toward the space. According to the method for manufacturing a seat pad, a seat pad having excellent heat resistance is easily obtainable.

The method for manufacturing a seat pad according to the present disclosure is preferably configured so that the mold used is one where, when the beaded foam is positioned in the interior of the mold, the space is formed between the mold and the beaded foam, and the through hole of the beaded foam is positioned offset from the gas venting portion. Accordingly, a seat pad having excellent heat resistance is more easily obtainable.

The method for manufacturing a seat pad according to the present disclosure is preferably configured so that the beaded foam used is beaded foam that has two below-buttocks openings and the through hole positioned between the two below-buttocks openings. Accordingly, a seat pad having excellent heat resistance for use as a rear seat of a vehicle is more easily obtainable.

Advantageous Effect

According to the present disclosure, a seat pad having excellent heat resistance and a method for manufacturing a seat pad to easily obtain the seat pad are provided.

BRIEF DESCRIPTION OF THE DRAWINGS

In the accompanying drawings:
FIG. 2 is a schematic bottom view diagram of the seat pad illustrated in FIG. 1.

FIG. 6 is a cross section diagram of the Y-Y cross section of the seat pad indicated in FIG. 1;

FIG. 10 is a schematic bottom view diagram of the beaded foam illustrated in FIG. 9;

FIG. 11 is a cross section diagram of the Z-Z cross section of the beaded foam indicated in FIG. 9;

DETAILED DESCRIPTION

A seat pad and a method for manufacturing a seat pad according to an embodiment of the present disclosure are described below, with reference to the drawings.

Seat Pad

A seat pad 1, according to the present embodiment of the present disclosure, is a seat pad for vehicle use, used in a seat for a vehicle (automobile seat). Further, in the following description, "up", "down", "left", "right", "front", "back", and the like refer to directions as viewed from a person seated on the seat. Further, in the following description, "left-right direction" is also referred to as "width direction". Further, according to the present embodiment, "lower surface" and "bottom surface" are synonymous. Further, according to the present embodiment, "rear" and "back" are synonymous.

Figure 1:
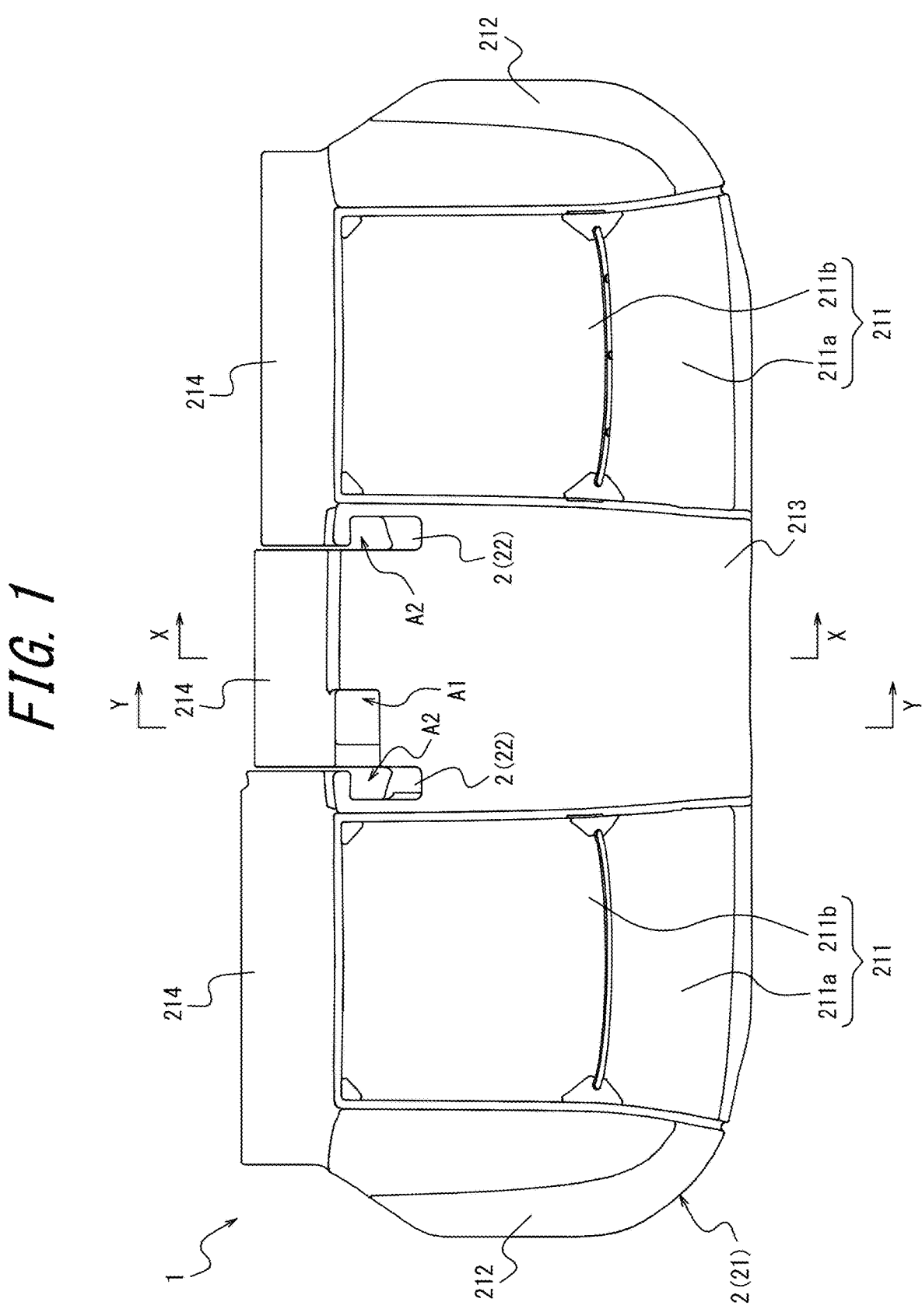
FIG. 1 is a schematic plan view diagram of a seat pad, according to an embodiment of the present disclosure.
Figure 2:
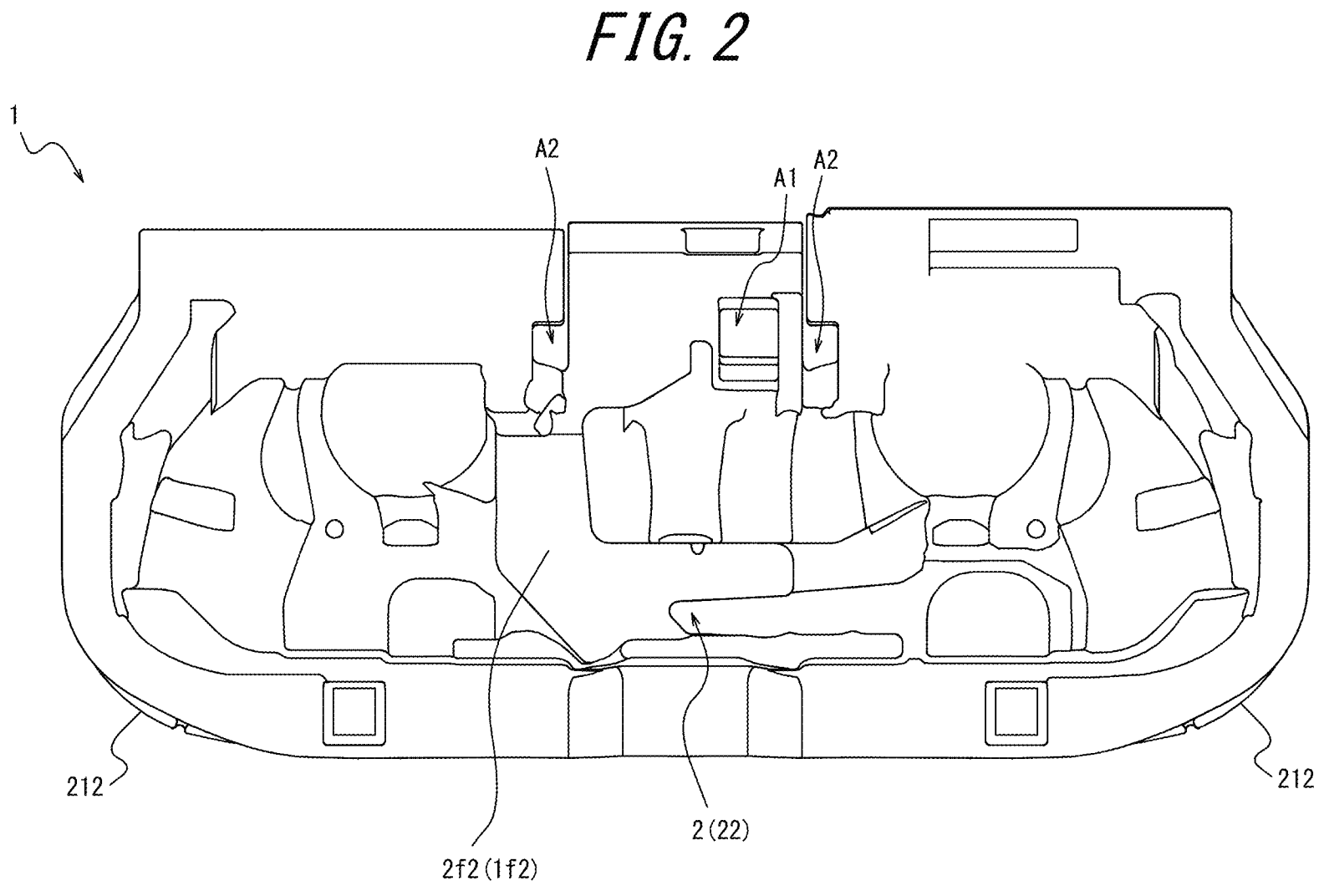
Figure 3:
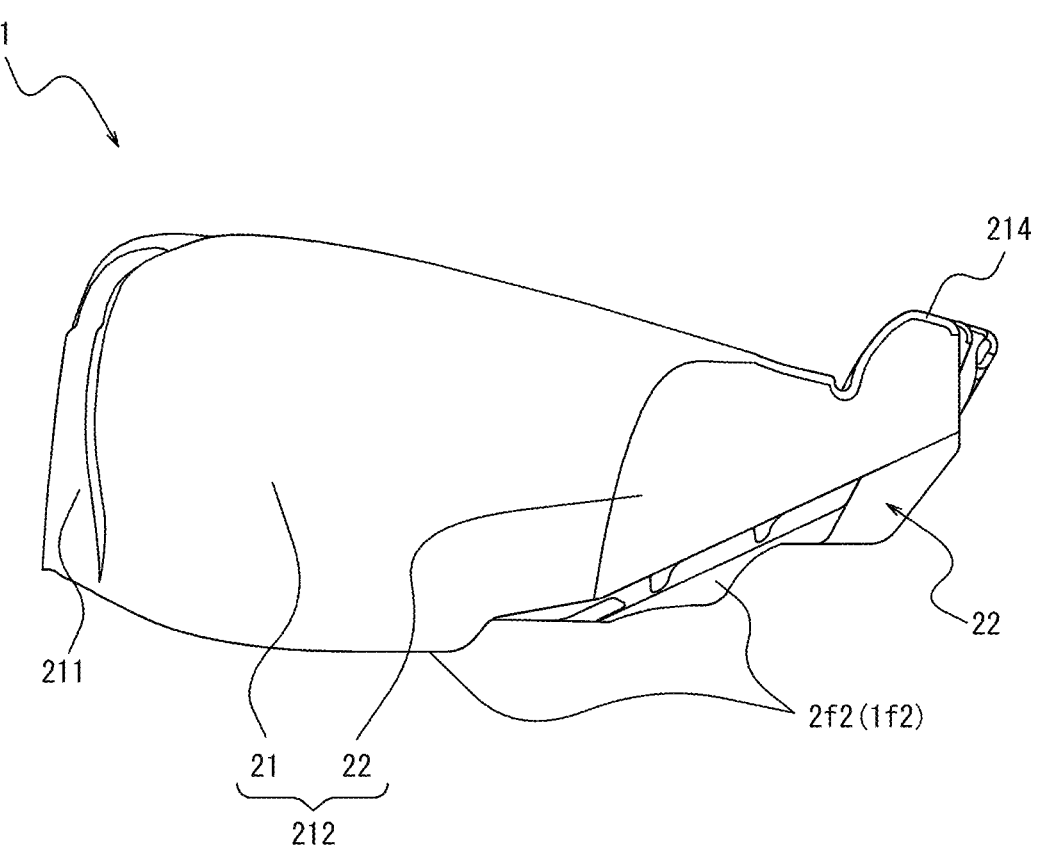
FIG. 3 is a schematic side view diagram of the seat pad illustrated in FIG. 1.
Figure 4:
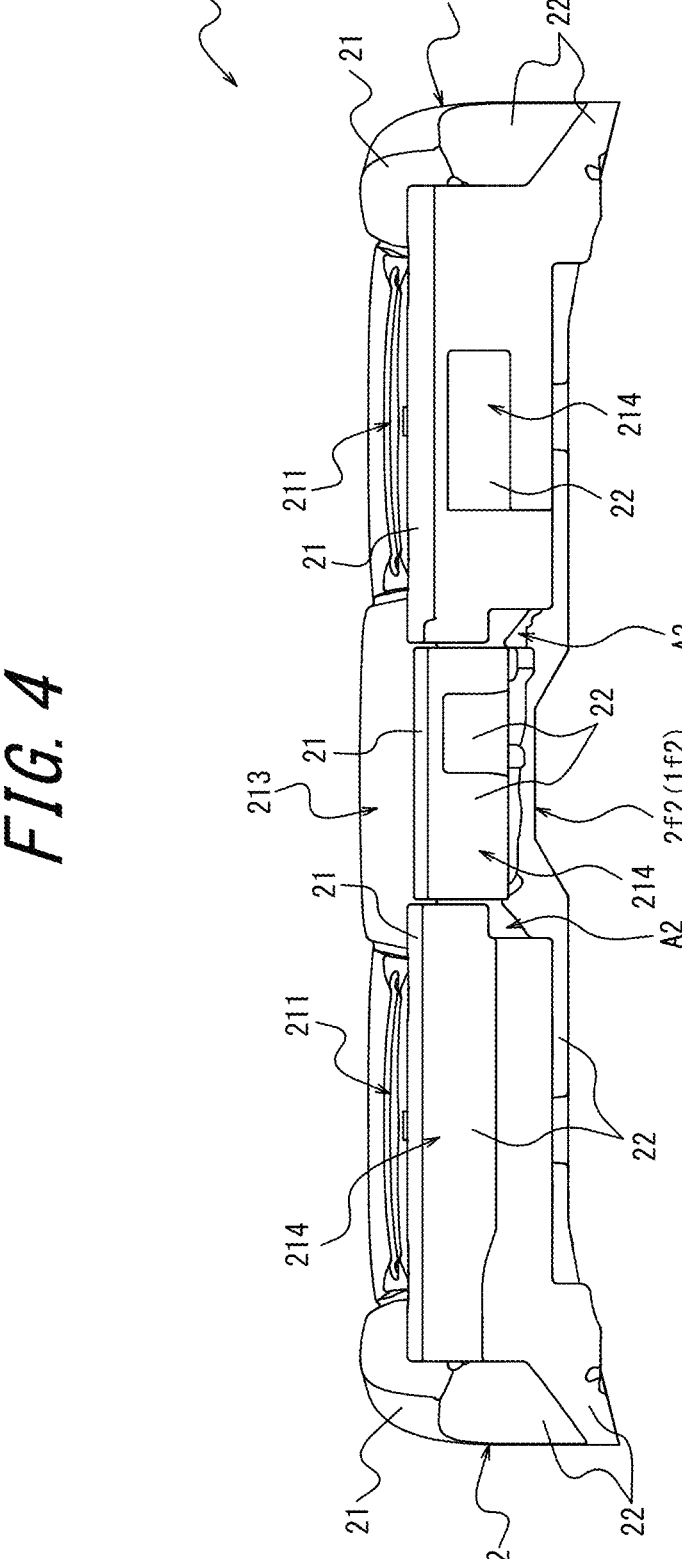
FIG. 4 is a schematic rear view diagram of the seat pad illustrated in FIG. 1.
Figure 5:
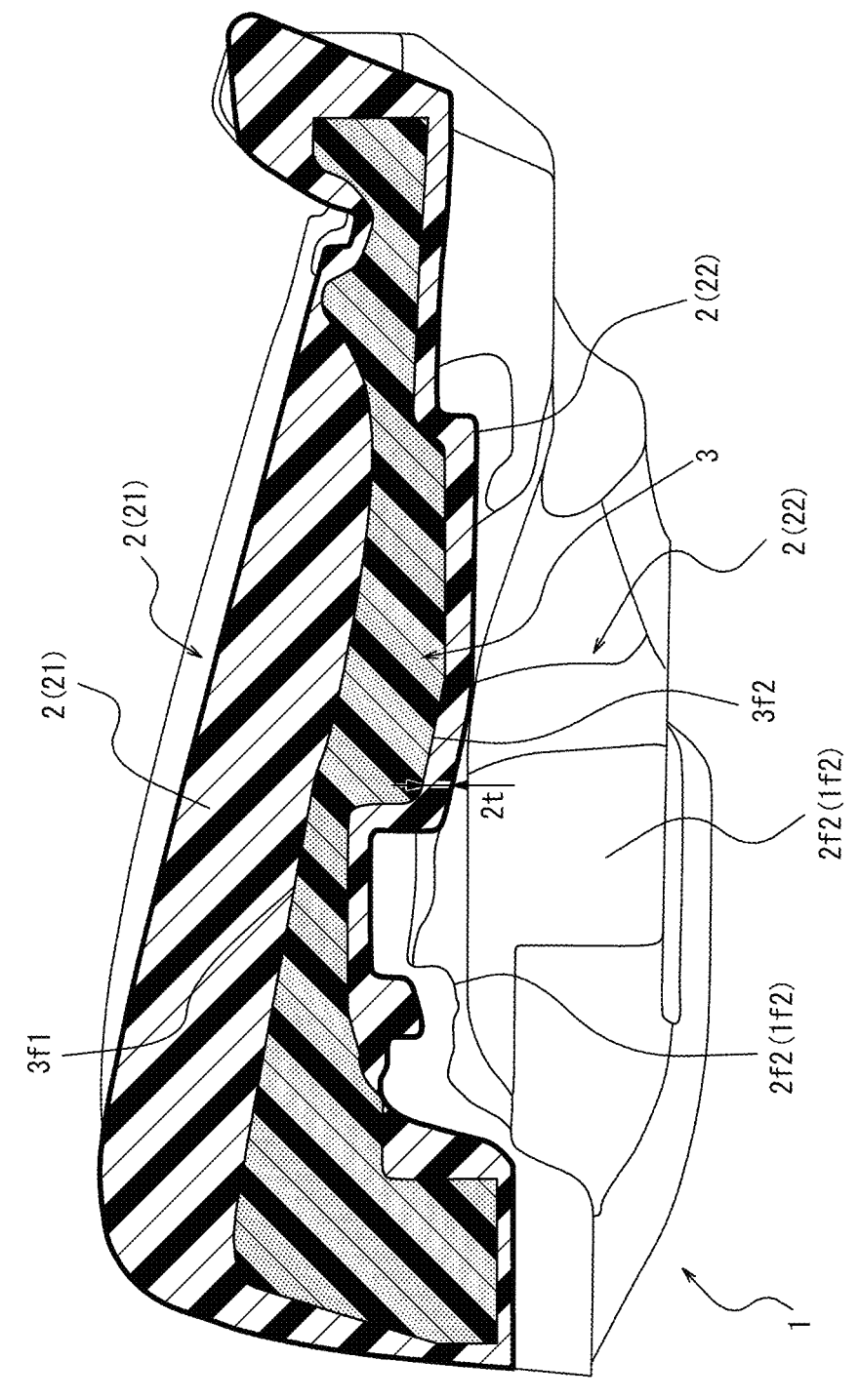
FIG. 5 is a cross section diagram of the X-X cross section of the seat pad indicated in FIG. 1.

FIG. 1 is a schematic plan view diagram of the seat pad 1, viewed from above. FIG. 2 is a schematic bottom view diagram of the seat pad 1. FIG. 3 is a schematic left side view diagram of the seat pad 1. FIG. 4 is a schematic rear side view diagram of the seat pad 1. FIG. 5 is a cross section diagram of the X-X cross section of the seat pad 1 indicated in FIG. 1.

The seat pad 1 is a seat pad that includes a cushion pad (a pad positioned under a seated person's buttocks). Referring to FIG. 1 through FIG. 4, according to the present embodiment, the seat pad 1 is a cushion pad. Referring to FIG. 5, the seat pad 1 includes a soft foam 2 and a beaded foam 3 embedded in the soft foam 2. The bottom surface (1/2) of the seat pad 1 is formed by the bottom surface 2/2 of the soft foam 2. The bottom surface of the seat pad 1 is, for example, the surface of a series of the lowest points at any position in the front-back and left-right directions of the seat pad 1, referring to the plan view diagram of FIG. 2. Specifically, the bottom surface 3/2 of the beaded foam 3 is entirely positioned above the bottom surface 2/2 of the soft foam 2.

According to the present embodiment, the soft foam 2 includes an upper soft foam 21 covering the top surface 3/1 of the beaded foam 3 and a lower soft foam 22 covering the bottom surface 3/2 of the beaded foam 3.

Figure 6:
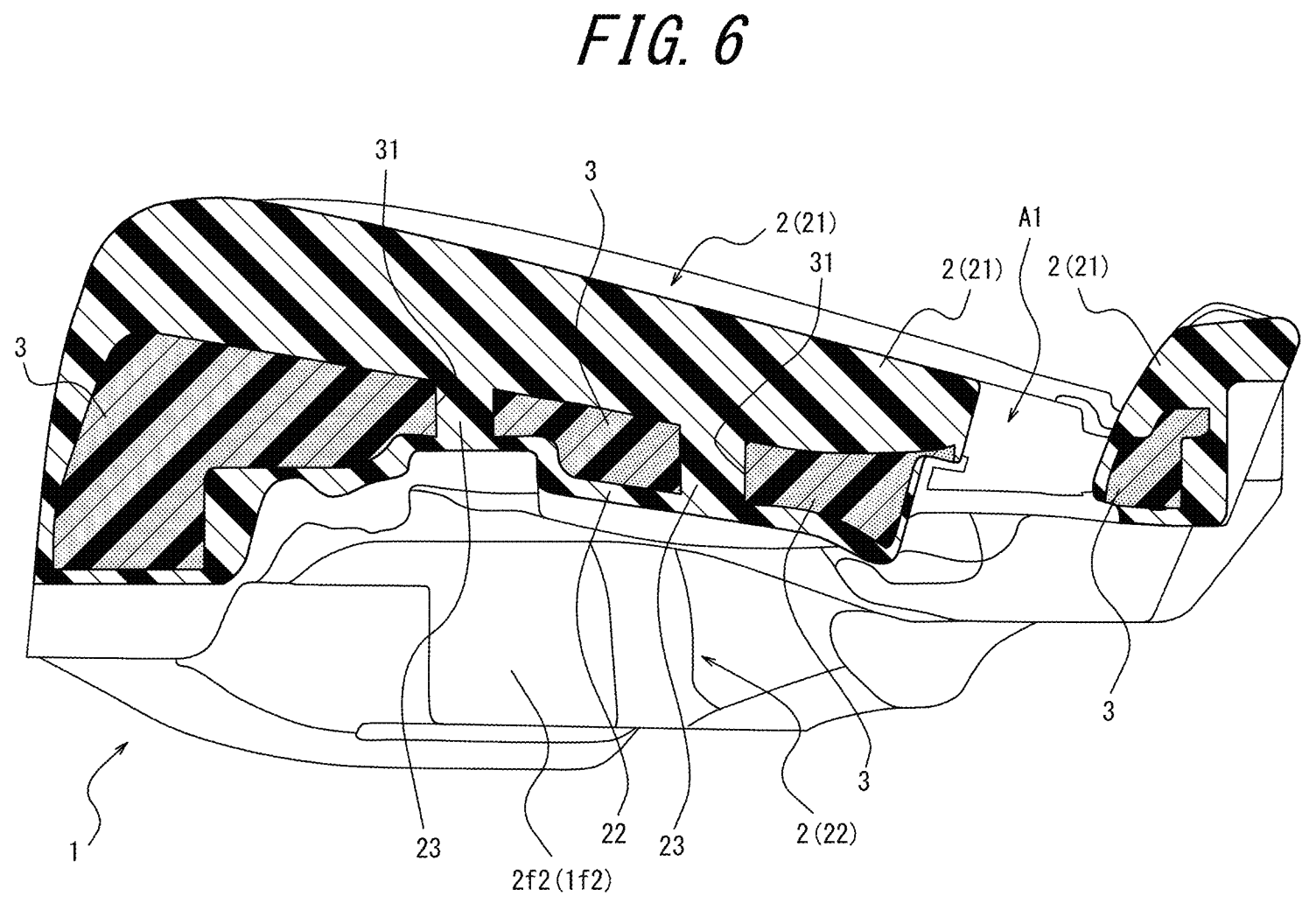

FIG. 6 is a cross section diagram of the Y-Y cross section of the seat pad 1 indicated in FIG. 1.

Referring to FIG. 6, according to the present embodiment, the beaded foam 3 has a through hole 31 in the vertical direction. The upper soft foam 21 and the lower soft foam 22 are connected via the through hole 31 formed in the beaded foam 3.

According to the present embodiment, the upper soft foam 21 and the lower soft foam 22 are connected by a connecting portion 23 that connects through the through hole 31. According to the present embodiment, the connecting portion 23 is formed by soft foam material that is filled into the through hole 31 together with the upper soft foam 21 and the lower soft foam 22.

According to the present embodiment, the seat pad 1 is a seat pad for rear seats of a vehicle.

For example, referring to FIG. 1, according to the present embodiment, the seat pad 1 is a cushion pad for rear seats of a vehicle, with two seats on either side formed as one integrated piece. According to the present embodiment, the seat pad 1 includes two main pad portions 211. Each of the main pad portions 211 is configured to support the buttocks and thighs of a seated person from below. Further, according to the present embodiment, the seat pad 1 includes a pair of side pad portions 212 that are positioned to the left or right of the two main pad portions 211, raised above the main pad portion 211, and configured to support a seated person from the left or right side, respectively. Further, according to the present embodiment, the seat pad 1 includes a center pad portion 213 positioned between the two main pad portions 211. In addition, the seat pad 1 includes an attachment portion 214 for attaching the seat pad 1 to a vehicle. Further, according to the present embodiment, the main pad portion 211 includes a below-thighs portion 211a, configured to support the thighs of a seated person from below, and a below-buttocks portion 211b, positioned rearward to the below-thighs portion 211a and configured to support the buttocks of a seated person from below.

According to the present embodiment, an upper outer portion (top surface) of the seat pad 1 is formed by the upper soft foam 21, as illustrated in FIG. 1. A lower outer portion (bottom surface) of the seat pad 1 is formed by the lower soft foam 22, as illustrated in FIG. 2. The reference sign A1 indicates a through hole for vehicle attachment for attaching the seat pad 1 to a vehicle. Further, the reference sign A2 indicates a notch for attaching a seatbelt. Further, referring to FIG. 3, according to the present embodiment, lateral outer portions of the seat pad 1 are formed by the upper soft foam 21 and the lower soft foam 22. Further, referring to FIG. 4, according to the present embodiment, a rear outer portion of the seat pad 1 is formed by the upper soft foam 21 and the lower soft foam 22.

Figure 7:
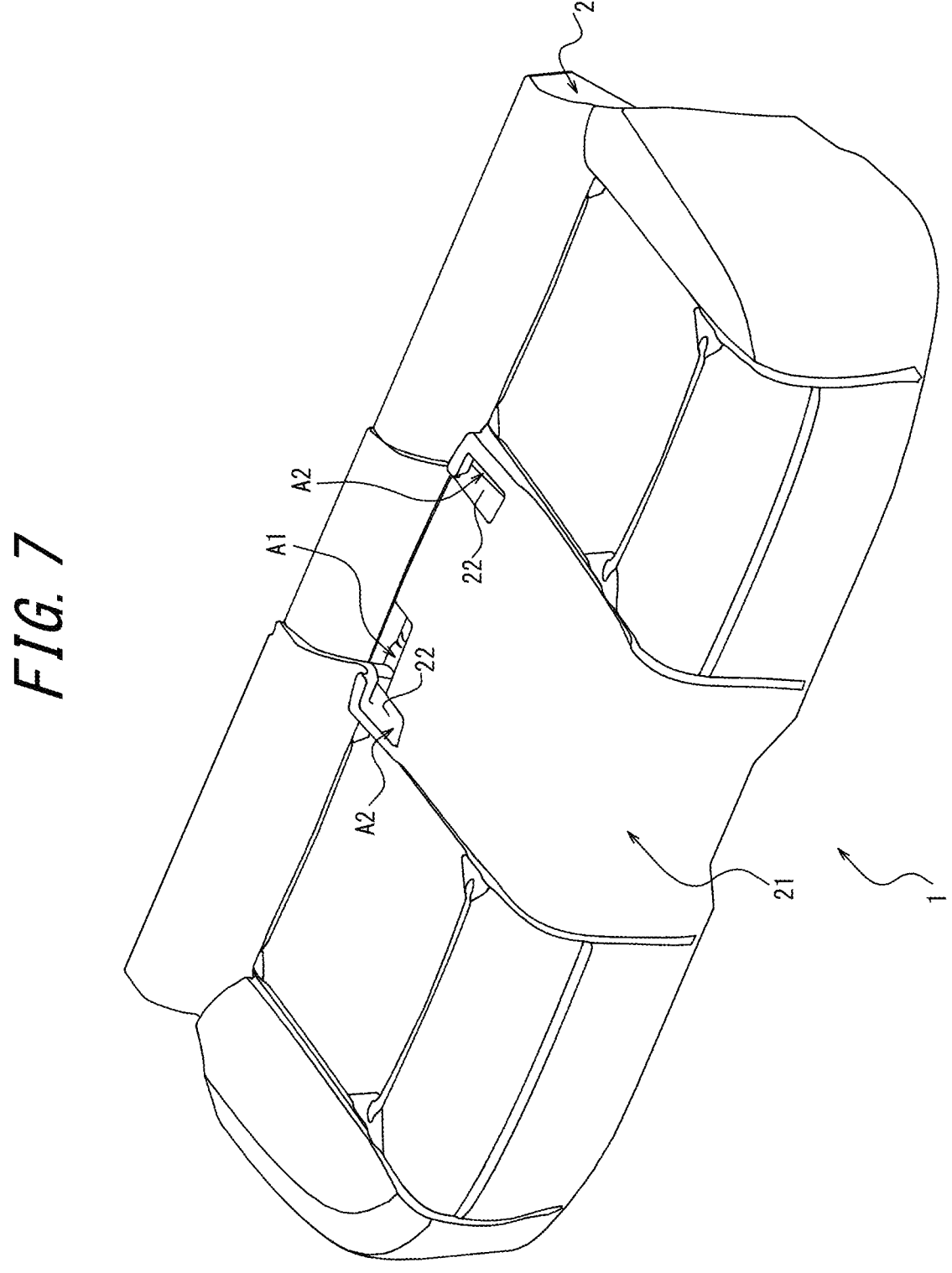
FIG. 7 is a schematic perspective view diagram of the seat pad illustrated in FIG. 1, viewed from above.
Figure 8:
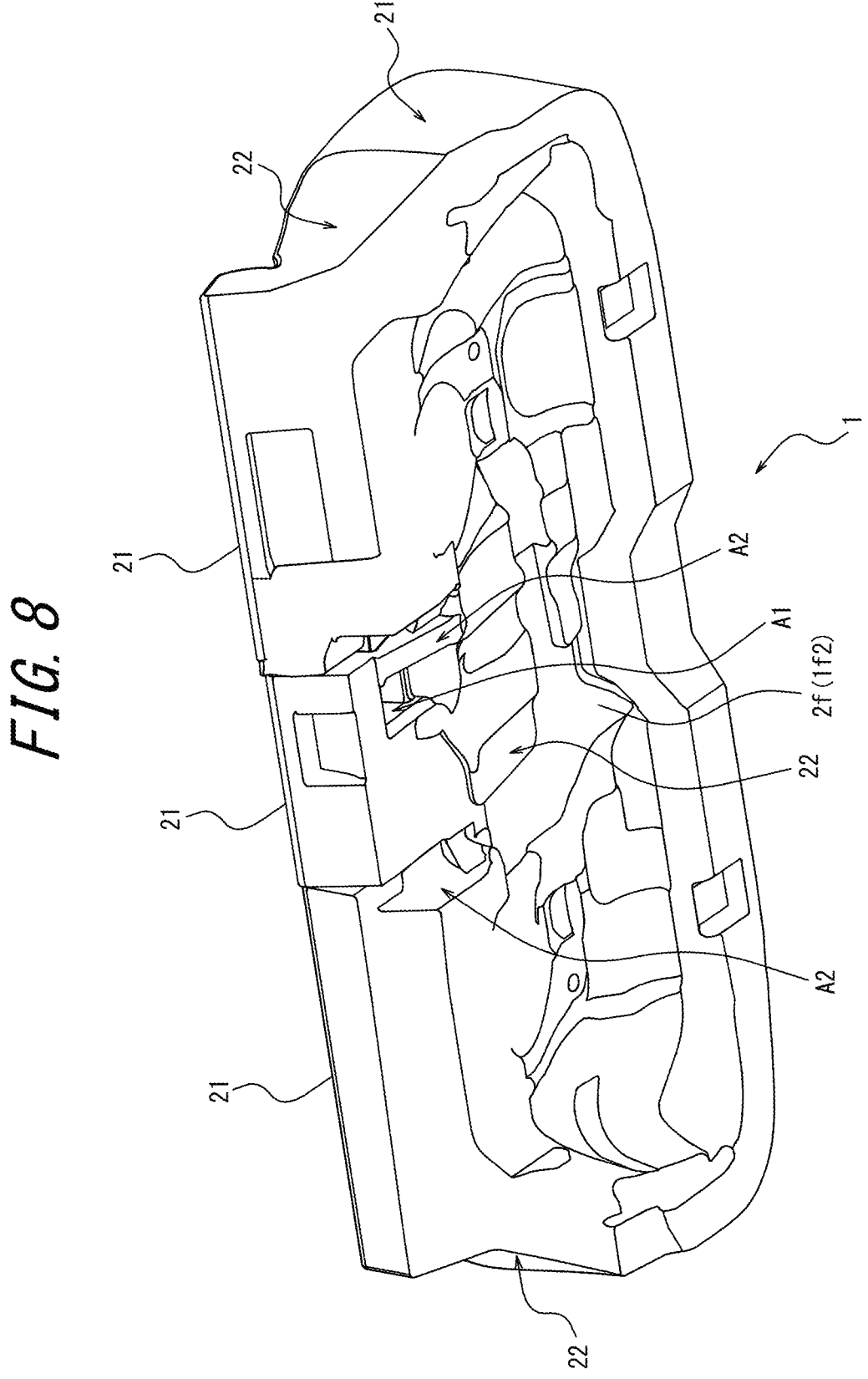
FIG. 8 is a schematic perspective view diagram of the seat pad illustrated in FIG. 1, viewed from below.

FIG. 7 schematically illustrates the seat pad 1 from above. Further, FIG. 8 schematically illustrates the seat pad 1 from below. As illustrated in these perspective view diagrams, according to the present embodiment, the outer surface of the seat pad 1 is formed by the upper soft foam 21 and the lower soft foam 22. According to the present embodiment, the beaded foam 3 may be completely embedded inside the soft foam 2. Accordingly, there is no portion of the bottom surface 1/2 of the seat pad 1 where the bottom surface 3/2 of the beaded foam 3 appears.

Figure 9:
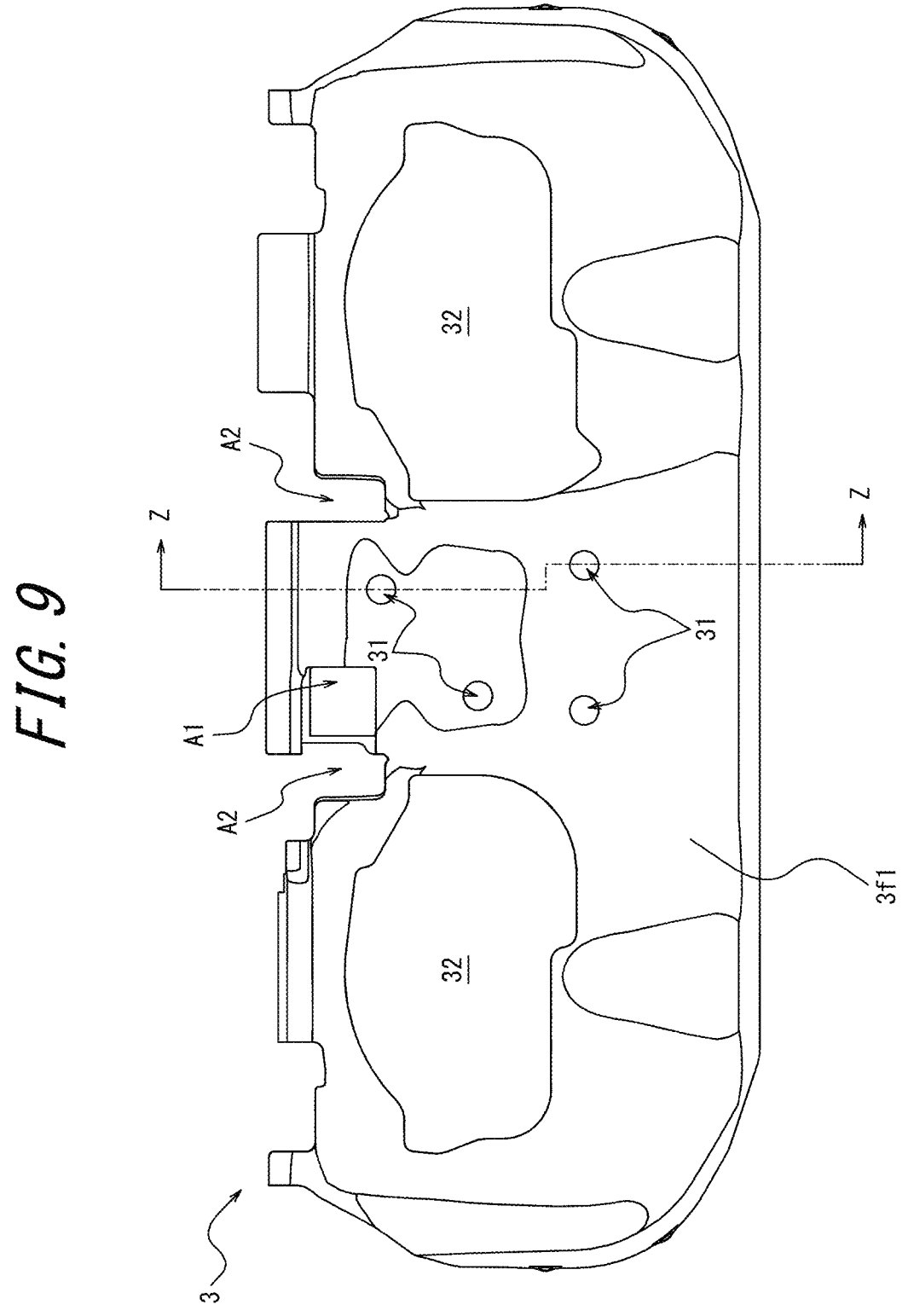
FIG. 9 is a schematic plan view diagram of an example of beaded foam included in the seat pad illustrated in FIG. 1.
Figure 10:
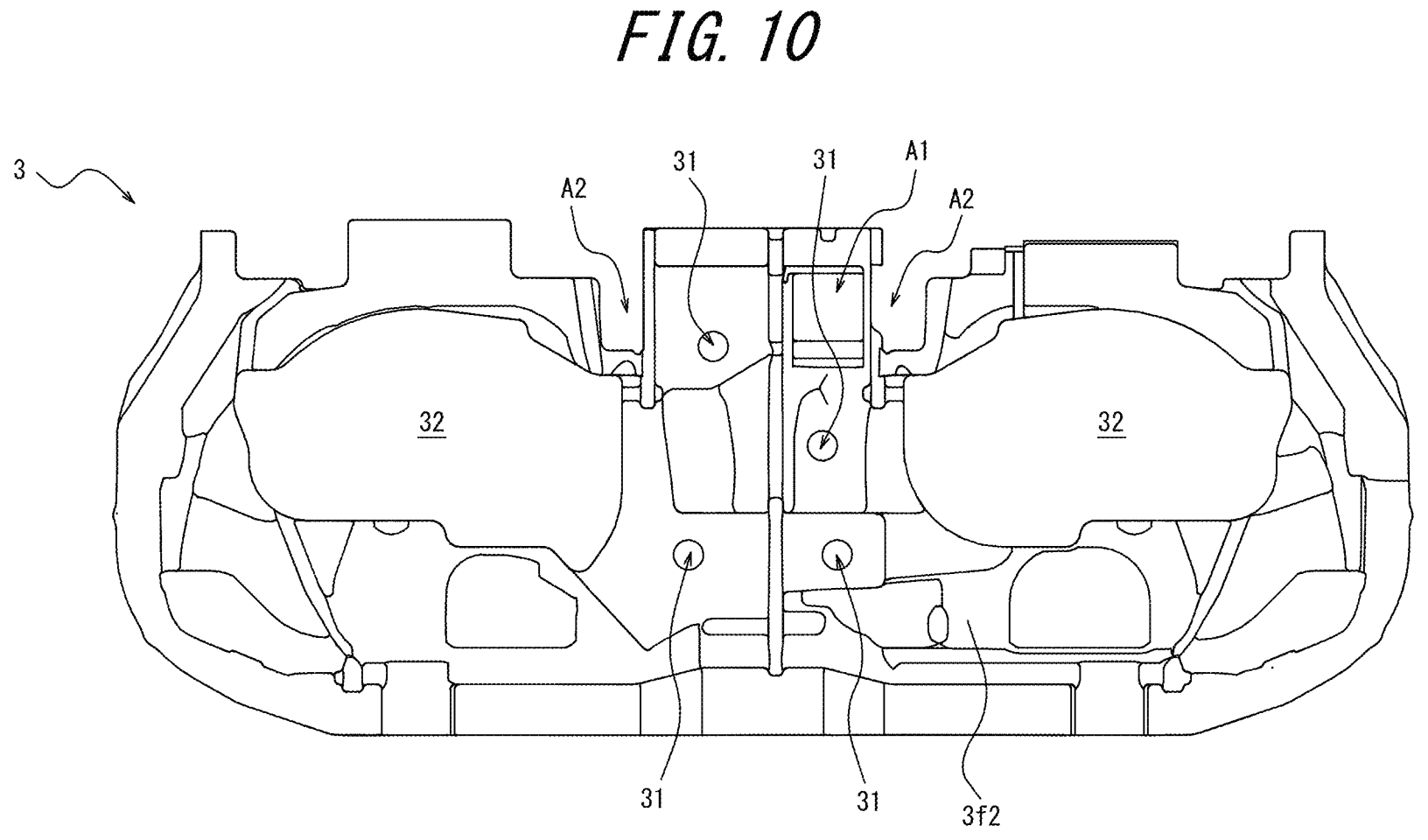
Figure 11:
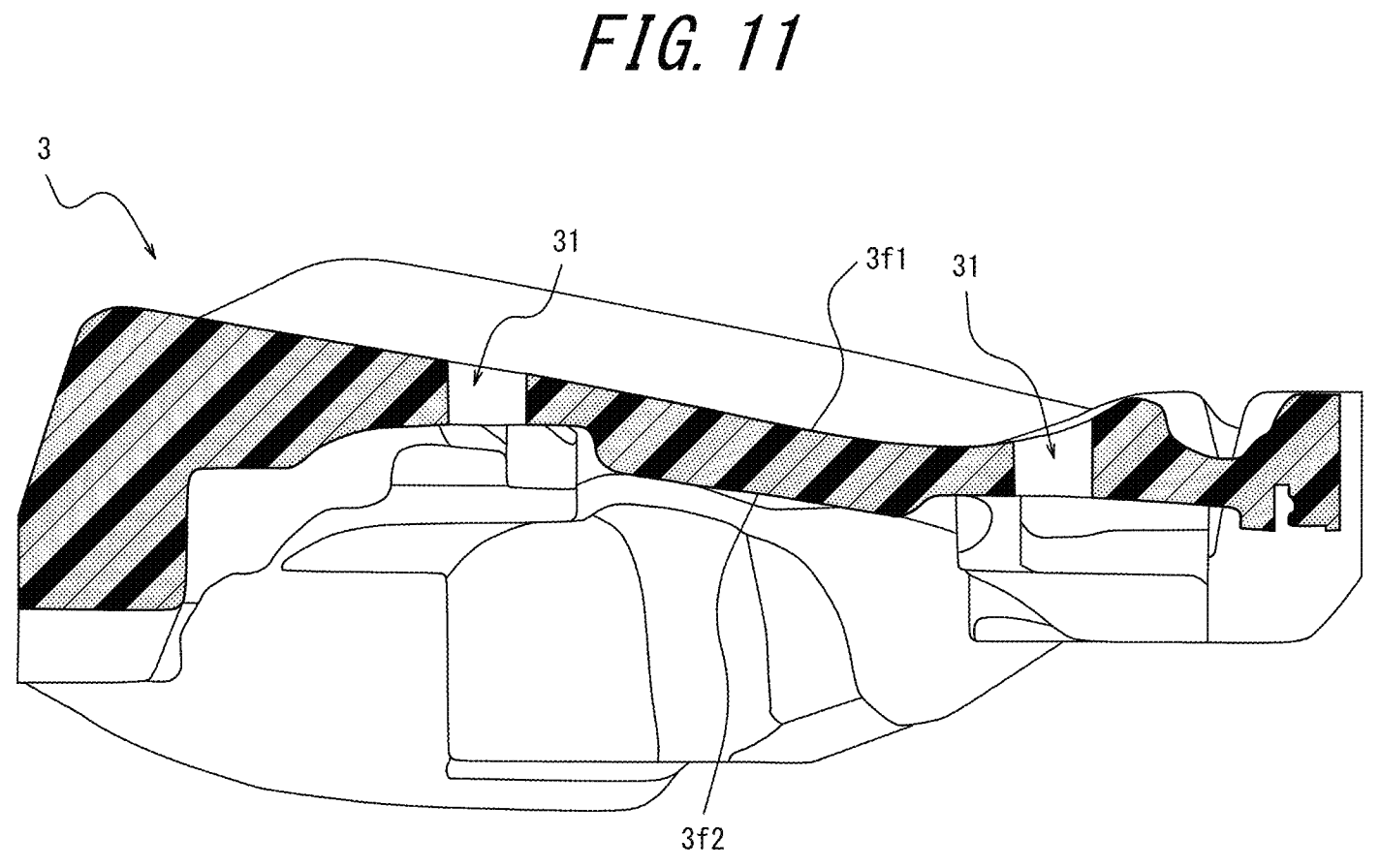
Figure 12:
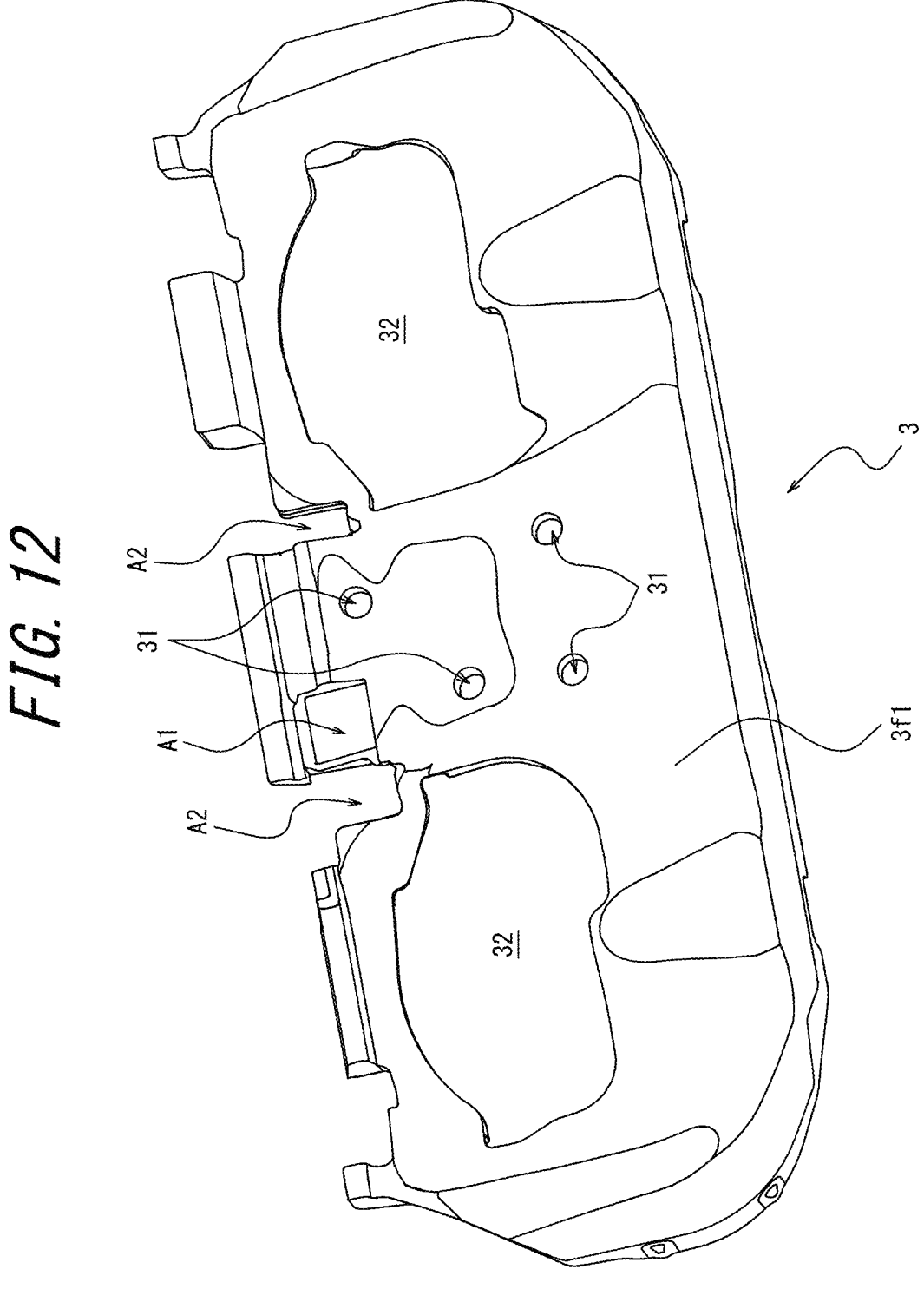
FIG. 12 is a schematic perspective view diagram of the beaded foam illustrated in FIG. 9, viewed from above.
Figure 13:
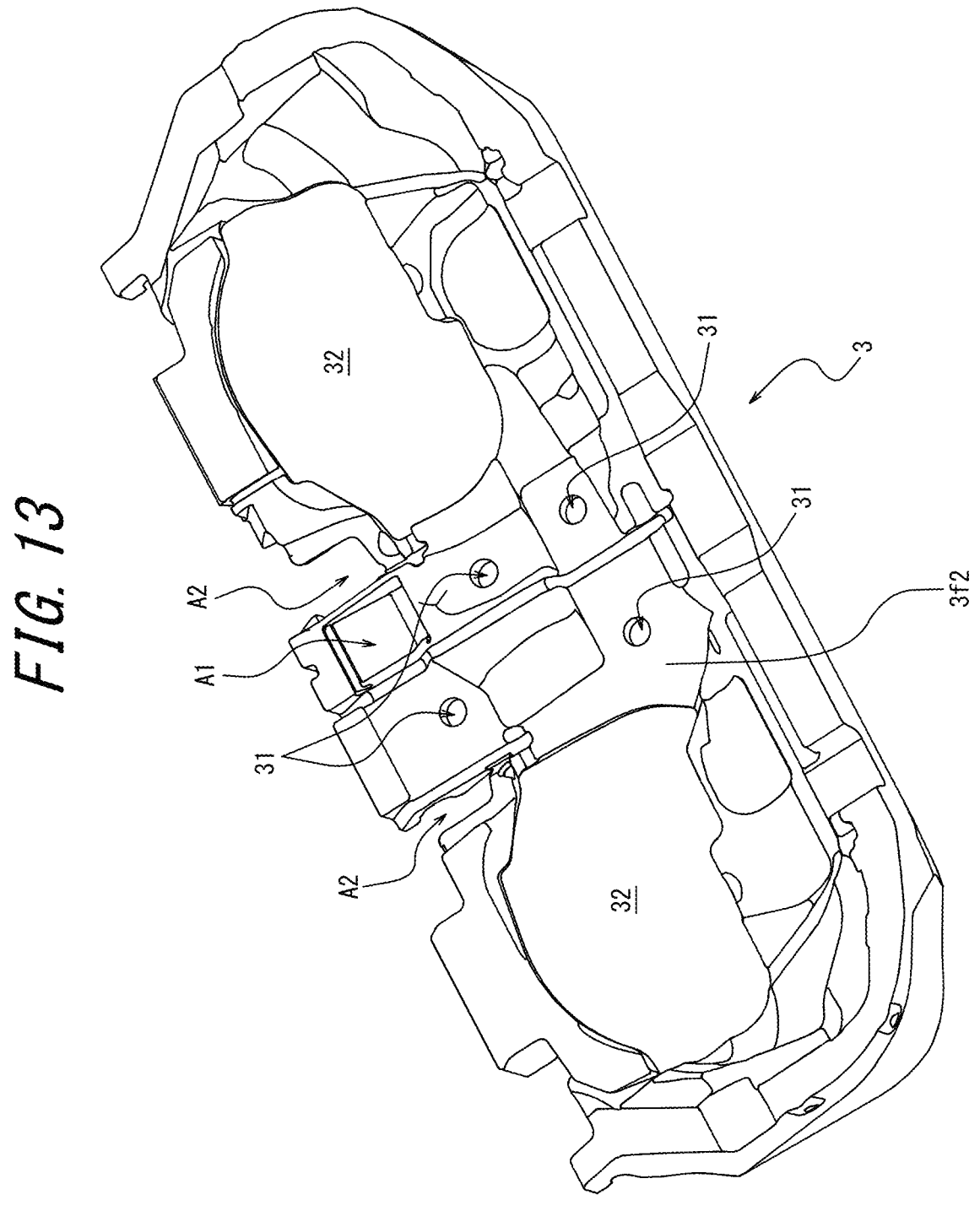
FIG. 13 is a schematic perspective view diagram of the beaded foam illustrated in FIG. 9, viewed from above.

FIG. 9 schematically illustrates an example of the beaded foam 3 included in the seat pad 1, viewed from above. Further, FIG. 10 schematically illustrates the beaded foam 3 illustrated in FIG. 9, viewed from below. Further, FIG. 11 illustrates the Z-Z cross section indicated in FIG. 9 of the beaded foam 3 illustrated in FIG. 9. Further, FIG. 12 schematically illustrates the beaded foam 3 illustrated in FIG. 9, viewed from above. Further, FIG. 13 schematically illustrates the beaded foam 3 illustrated in FIG. 9, viewed from below.

The beaded foam 3 has two below-buttocks openings 32. The two below-buttocks openings 32 are spaced apart from each other in the left-right (width) direction. Further, the through hole 31 through the beaded foam 3 is positioned between the two below-buttocks openings 32.

According to the present embodiment, the beaded foam 3 constitutes a core (seat pad body) of the seat pad 1. Referring to FIG. 12 and FIG. 13, the beaded foam 3 has a flat plate shape. Further, according to the present embodiment, the beaded foam 3 has the through hole A1 for vehicle attachment and the notch A2 for seatbelt attachment.

According to the present embodiment, each of the below-buttocks openings 32 is a through hole. The below-buttocks openings 32 penetrate the beaded foam 3 in the vertical direction. According to the present embodiment, the hole diameter (opening area) of each of the below-buttocks openings 32 is larger than the hole diameter (opening area) of the through hole 31. However, each of the below-buttocks openings 32 may be a non-penetrating recess.

The through hole 31 also penetrates the beaded foam 3 in the vertical direction. According to the present embodiment, the through hole 31 is a round hole, as illustrated in FIG. 9 and FIG. 10. However, the through hole 31 may be any of various shapes such as a polygonal hole such as a rectangular hole, a slit hole such as an elliptical hole, and the like. Further, size (for example, diameter) of the through hole 31 may be set as appropriate.

Further, according to the present embodiment, a plurality of the through hole 31 is formed in the beaded foam 3. According to the present embodiment, the through holes 31 are arranged in multiple rows in the front-back and left-right directions, respectively. Specifically, four of the through holes 31 are arranged in two rows in the front-back and left-right directions, respectively. According to the present embodiment, three of the through holes 31 are positioned between the two below-buttocks openings 32. Further, according to the present embodiment, one of the through holes 31 is positioned between the through hole A1 for vehicle attachment and the notch A2 for seatbelt attachment. However, arrangement of the through holes 31 may be set as appropriate. Further, spacing between the through holes 31 may be set as appropriate. Further, there may be one or more of the through holes 31.

For example, referring to FIG. 5, the bottom surface of the seat pad 1 is formed by the bottom surface 2F2 of the soft foam 2. That is, the beaded foam 3 is embedded in the soft foam 2 so that the bottom surface 3/2 of the beaded foam 3 is positioned above the bottom surface 2/2 of the soft foam 2. In other words, the soft foam 2 covers the bottom surface 3/2 of the beaded foam 3 so that the bottom surface 2/2 of the soft foam 2 protrudes more than the bottom surface 3/2 of the beaded foam 3. Therefore, according to the seat pad 1, the bottom surface 3/2 of the beaded foam 3 may be prevented from direct contact with a heat source or the like. Therefore, the seat pad 1 has excellent heat resistance. In particular, when the beaded foam 3 is completely embedded inside the soft foam 2, there is no portion of the bottom surface 1/2 of the seat pad 1 where the bottom surface 3/2 of the beaded foam 3 appears. Therefore, the seat pad 1 has excellent heat resistance. However, according to the seat pad 1, even when the soft foam 2 has an opening that leads to the bottom surface 3/2 of the beaded foam 3, as in the vicinity of the through hole A1 for vehicle attachment illustrated in FIG. 6, an air layer is formed between a heat source and the bottom surface 3/2 of the beaded foam 3. Accordingly, the air layer serves as a thermal insulation layer.

Further, in the seat pad 1, the soft foam 2 includes the upper soft foam 21 covering the top surface 3/1 of the beaded foam 3 and the lower soft foam 22 covering the bottom surface 3/2 of the beaded foam 3. Accordingly, the beaded foam 3 that is harder than the soft foam 2 is able to serve as the core (seat pad body) of the seat pad 1. Accordingly, support stability is improved for a seated person. On the other hand, a seated person may feel the hardness of the seat pad 1 in proportion to the extent that support stability is improved. To address this, the seating side of the seat pad 1 is covered by the soft foam 2. Therefore, according to the seat pad 1, excellent heat resistance is provided while comfort is improved for seating.

Further, referring to FIG. 6 for example, in the seat pad 1, the beaded foam 3 has the through hole 31 penetrating through in the vertical direction, and the upper soft foam 21 and the lower soft foam 22 are connected via the through hole 31. Accordingly, by positioning the beaded foam 3 inside a mold as an insert and supplying soft foam resin into the mold, the soft foam 2 may be formed on both the top surface 3/1 and the bottom surface 3/2 of the beaded foam 3. Therefore, the seat pad 1 has excellent heat resistance and is easy to manufacture.

Further, according to the present embodiment, the seat pad 1 is a seat pad for rear seats of a vehicle. Typically, a heat source device that generates a large amount of heat, such as a battery, engine, and the like, is positioned under rear seats. Therefore, the seat pad 1 is particularly effective for use as a seat pad for rear seats of a vehicle, as in the present embodiment.

Further, referring to FIG. 9 for example, in the seat pad 1, the beaded foam 3 has two below-buttocks openings 32, and the through holes 31 are positioned between the two below-buttocks openings 32. Accordingly, the seat pad 1 is a seat pad for rear seats of a vehicle, has excellent heat resistance, and is easy to manufacture. Further, the hardness of the below-buttocks portions of the seat pad 1 is kept low, securing comfortable seating.

In the seat pad 1, the soft foam 2 is a soft foam that has elasticity. The soft foam 2 may be, for example, soft polyurethane foam. In the seat pad 1, the beaded foam 3 is a foam that is harder and more elastic than the soft foam 2. The beaded foam 3 may be, for example, an olefinic resin, and specifically beaded expanded polypropylene (EPP), beaded expanded polystyrene (EPS), and the like. Herein, "beaded foam" is foam obtained by a bead foaming method. A beaded foam is obtained by foaming of pre-foamed foam beads in a mold.

In the seat pad 1, the soft foam 2 is preferably composed of soft polyurethane foam, and the beaded foam 3 is preferably composed of beaded expanded polypropylene or beaded expanded polystyrene. Accordingly, the use of commonly used soft foam material and beaded foam material results in a seat pad having excellent cost performance. In particular, when the beaded foam 3 is composed of beaded expanded polystyrene, the beaded expanded polystyrene has lower heat resistance than other beaded foams. Therefore, when the beaded foam 3 is composed of beaded expanded polystyrene, application of the present disclosure is effective in improving heat resistance.

Method for Manufacturing Seat Pad

Next, a method for manufacturing a seat pad according to an embodiment of the present disclosure is described below.

The manufacturing method may be appropriately used to manufacture the seat pad 1 described with reference to FIG. 1 through FIG. 13.

Figure 14:
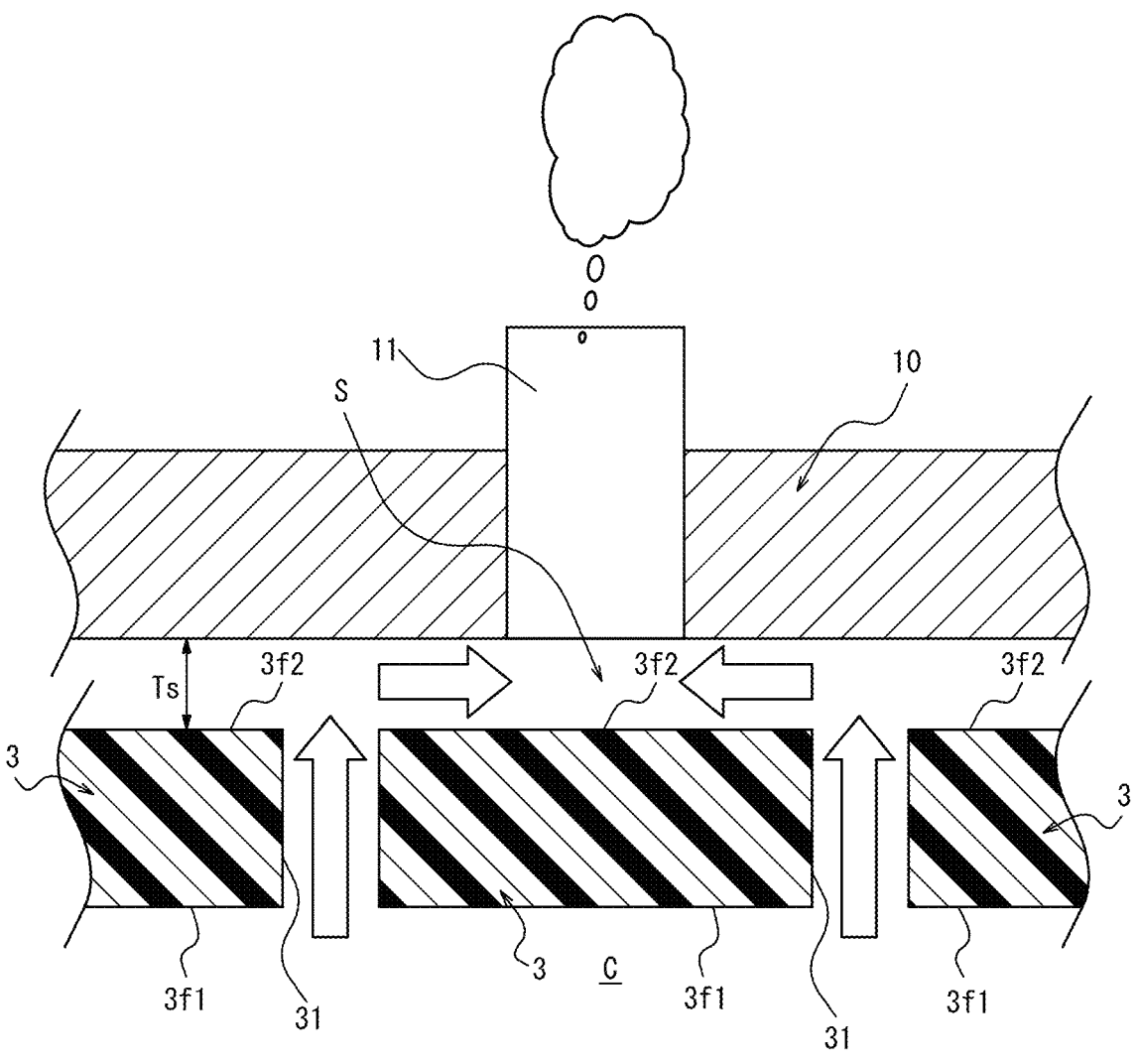
FIG. 14 is a schematic illustration for explanation of a method for manufacturing a seat pad, according to an embodiment of the present disclosure.

The method for manufacturing a seat pad according to the present embodiment (hereinafter also referred to as "the manufacturing method") uses a mold 10 including a gas venting portion 11 and the beaded foam 3 with the through hole 31, to obtain a seat pad in which the outer surface (3/1, 3/2) of the beaded foam 3 with the through hole 31 opening is covered by the soft foam 2, as illustrated in FIG. 14. The manufacturing method includes beaded foam setting, where the beaded foam 3 is positioned in the interior of the mold 10 so that a space S is formed between the mold 10 and the beaded foam 3, and the through hole 31 of the beaded foam 3 is positioned offset from the gas venting portion 11. The manufacturing method also includes foam material supplying after completion of the beaded foam setting, where soft foam material is supplied to the interior of the mold 10 so that the soft foam material passes through the through hole 31 in the beaded foam 3 toward the space S.

In the manufacturing method, "offset" means that the gas venting portion 11 of the mold 10 and the through hole 31 of the beaded foam 3 do not overlap, as illustrated in FIG. 14. Accordingly, material (resin material) supplied through the through hole 31 of the beaded foam 3 is not directly distributed to the gas venting portion 11 of the mold 10. The gas venting portion 11 may be, for example, a through hole formed in the mold 10.

In the manufacturing method, the interior of the mold 10 is a cavity C formed inside the mold 10. The mold 10 includes, for example, an upper mold and a lower mold. Accordingly, the cavity C is formed by aligning the upper mold and the lower mold. The cavity C forms the outer shape of the seat pad 1. Further, the interior of the mold 10 includes the space S formed between the mold 10 and the beaded foam 3.

As in the manufacturing method, when the beaded foam 3 with the through hole 31 is positioned in the cavity C of the mold 10 as an insert, and soft foam material is supplied to the cavity C of the mold 10, the soft foam 2 (21, 22) may be formed on both the top surface 3/1 and the bottom surface 3/2 of the beaded foam 3. The lower soft foam 22 covering the bottom surface 3/2 of the beaded foam 3 is formed in the space S formed between the mold 10 and the beaded foam 3. Therefore, the thickness 2t of the lower soft foam 22 (see FIG. 5) may be thickened by widening a spacing Ts of the space S. Conversely, the thickness t2 of the lower soft foam 22 may be made thinner by narrowing the spacing Ts of the space S.

However, when supplying the soft foam material to the cavity C of the mold 10, in a case of the air in the cavity C of the mold 10 not being properly evacuated, the soft foam material may not fill the cavity C, which would result in a lack of thickness of the molded product (the seat pad 1). For this reason, the gas venting portion 11 is preferably formed in the mold 10.

However, even when the mold 10 including the gas venting portion 11 is used, the molded product may still have insufficient thickness.

The inventors, after intensive testing and research, realized that in many cases where a molded product lacked thickness, the gas venting portion 11 formed in the mold 10 was aligned with the through hole 31 formed in the beaded foam 3, and the reason for the lack of thickness is that the soft foam material supplied through the through hole 31 in the beaded foam 3 immediately, while foaming, seals the gas venting portion 11 at the position aligned with the through hole 31.

According to the manufacturing method, when the beaded foam 3 is positioned inside the mold 10 as described above, the gas venting portion 11 of the mold 10 is positioned offset from the through hole 31 of the beaded foam 3. Accordingly, even when the soft foam material is supplied through the through hole 31 in the beaded foam 3 toward the space S, the soft foam material does not immediately seal the gas venting portion 11. Therefore, air generated inside the mold 10, in particular in the space S, is efficiently released through the gas venting portion 11. Therefore, the manufacturing method is able to suppress a lack of thickness in the molded product that could render the molded product unusable.

Therefore, according to the manufacturing method, the seat pad 1 having excellent heat resistance is easily obtainable. The gas venting portion 11 of the mold 10 may be laid out in various positions as long as the position does not overlap with the through hole 31 of the beaded foam 3, referring to the plan view diagram of FIG. 9. Further, a plurality of the gas venting portion 11 may be provided.

In particular, in the manufacturing method, the spacing Ts of the space S is preferably in a range from 5 mm to 10 mm. In a conventional seat pad manufacturing method, a lack of thickness easily occurs when the spacing Ts of the space S is in the range from 5 mm to 10 mm. Therefore, when the spacing Ts of the space S is in the range from 5 mm to 10 mm, the manufacturing method is effective in suppressing the occurrence of a lack of thickness.

Referring to FIG. 14, the manufacturing method uses the mold 10 where, when the beaded foam 3 is positioned in the interior of the mold, the space S is formed between the mold 10 and the beaded foam 3, and the through hole 31 of the beaded foam 3 is positioned offset from the gas venting portion 11. Accordingly, the seat pad 1 having excellent heat resistance is more easily obtainable.

Referring to FIG. 9 and FIG. 10, the manufacturing method uses the beaded foam 3 that has the two below-buttocks openings 32 and the through hole 31 positioned between the two below-buttocks openings 32. Accordingly, a seat pad having excellent heat resistance for use as a rear seat of a vehicle is more easily obtainable. Further, the hardness of the below-buttocks portions of the seat pad 1 is kept low, and therefore a seat pad for use as a rear seat of a vehicle is obtainable that secures comfortable seating.

As described above, the present disclosure provides a seat pad having excellent heat resistance and a method for manufacturing a seat pad to easily obtain the seat pad.

The above description is only of example embodiments of the present disclosure, and various modifications are possible according to the scope of the claims. For example, the seat pad 1 is a cushion pad, but may be a combination of a cushion pad and a back pad. Accordingly, the seat pad according to the present disclosure may be applied to at least one of a cushion pad or a cushion pad and a back pad. Further, the seat pad according to the present disclosure may be applied to only a cushion pad, or only a cushion pad and a back pad. Further, the seat pad according to the present disclosure may be a seat pad for a front seat of a vehicle.

REFERENCE SIGNS LIST

1: seat pad, 1/2: bottom surface of seat pad, 2: soft foam, 2/2: bottom surface of soft foam, 21: upper soft foam, 22: lower soft foam, 3: beaded foam, 3/1: top surface of beaded foam, 3/2: bottom surface of beaded foam, 31: through hole, 32: below-buttocks opening, 10: mold, 11: gas venting portion, C: cavity, S: space

The invention claimed is:

1. A seat pad comprising a cushion pad, the cushion pad comprising a soft foam and a beaded foam embedded in the soft foam, wherein the bottom surface of the cushion pad is the bottom surface of the soft foam, the seat pad is for a rear seat of a vehicle, and the beaded foam has two below-buttocks openings and a through hole positioned between the two below-buttocks openings.

2. The seat pad according to claim 1, wherein the soft foam comprises an upper soft foam covering the top surface of the beaded foam and a lower soft foam covering the bottom surface of the beaded foam.

3. The seat pad according to claim 2, wherein the beaded foam has the through hole in the vertical direction, and the upper soft foam and the lower soft foam are connected via the through hole through the beaded foam.

4. The seat pad according to claim 3, wherein the soft foam is composed of soft polyurethane foam, and the beaded foam is composed of beaded expanded polypropylene or beaded expanded polystyrene.

5. The seat pad according to claim 2, wherein the soft foam is composed of soft polyurethane foam, and the beaded foam is composed of beaded expanded polypropylene or beaded expanded polystyrene.

6. The seat pad according to claim 1, wherein the soft foam is composed of soft polyurethane foam, and the beaded foam is composed of beaded expanded polypropylene or beaded expanded polystyrene.

7. A method for manufacturing a seat pad, using a mold including a gas venting portion and a beaded foam with a through hole, wherein the outer surface of the beaded foam with the through hole opening is covered by a soft foam, the method comprising:

beaded foam setting, wherein the beaded foam is positioned in the interior of the mold so that a space is formed between the mold and the beaded foam and the through hole of the beaded foam is positioned offset from the gas venting portion; and foam material supplying after completion of the beaded foam setting, wherein soft foam material is supplied to the interior of the mold so that the soft foam material passes through the through hole in the beaded foam toward the space.

8. The method for manufacturing a seat pad according to claim 7, wherein the mold used is one where, when the beaded foam is positioned in the interior of the mold, the space is formed between the mold and the beaded foam, and the through hole of the beaded foam is positioned offset from the gas venting portion.

9. The method for manufacturing a seat pad according to claim 7, wherein the beaded foam used is beaded foam that has two below-buttocks openings and the through hole positioned between the two below-buttocks openings.

10. The method for manufacturing a seat pad according to claim 8, wherein the beaded foam used is beaded foam that has two below-buttocks openings and the through hole positioned between the two below-buttocks openings.

\* \* \* \* \*